United States Patent [19]

Rowland

[11] 4,340,413
[45] Jul. 20, 1982

[54] TRANSFER MECHANISM IN A GLASSWARE FORMING MACHINE

[75] Inventor: Roger G. Rowland, Southport, England

[73] Assignee: E. R. Lattimer Limited, Southport, England

[21] Appl. No.: 222,136

[22] Filed: Jan. 2, 1981

[30] Foreign Application Priority Data

Sep. 27, 1980 [GB] United Kingdom ............... 8031299

[51] Int. Cl.³ ........................................... B65G 47/14
[52] U.S. Cl. ..................................... 65/375; 198/490; 65/260
[58] Field of Search ................. 198/490, 489; 65/375, 65/260; 92/85 R

[56] References Cited

U.S. PATENT DOCUMENTS 3,559,537 2/1971 Faure ............................. 198/490 X
3,735,854 5/1973 Hirsch ............................. 198/490
3,969,989 7/1976 Maurer et al. ..................... 92/85 R Primary Examiner—Richard V. Fisher
Attorney, Agent, or Firm—Ross, Ross & Flavin

[57] ABSTRACT

In a glassware forming machine, a non-handed transfer mechanism, for transferring freshly-formed hot glassware, by swinging through a right angle about a vertical axis, from a dead plate to an adjacent conveyor, comprises a side-by-side parallel pair of rams having pistons on the free ends of which is a pusher plate. A piston stop bar is located centrally of the pistons and is connected to a piston tie plate for arresting the pusher plate and pistons at the end of an extending stroke of the pistons.

5 Claims, 7 Drawing Figures

TRANSFER MECHANISM IN A GLASSWARE FORMING MACHINE

BACKGROUND OF THE INVENTION

This invention relates to a glassware forming machine and particularly to transfer apparatus, in such a machine which serves to transfer hot newly-formed glassware articles from a dead plate onto a moving conveyor leading to a lehr.

In known machines of this kind, the transfer apparatus generally comprises a pusher plate having protruding fingers and displaceable by means of a pneumatic motor comprising only a single pneumatic cylinder and piston. The pusher plate is mounted on the piston and on two guide rods which extend parallel to the axis of the piston through bushings carried by a body in which the cylinder is contained. The cylinder body is mounted upon a base plate which is capable of swinging the pneumatic cylinder through an arc of 90° about a vertical axis to perform the article-transferring operation. Because space is at a premium and it is not possible to take fasteners, for mounting the cylinder body onto the base plate, through the cylinder body, it has always been necessary for the cylinder to be offset relative to the swinging axis, with the result that the known arrangements are always either right-handed or left-handed. In general, no practicable means can be adopted to secure the pneumatic cylinder to the base plate with its centre line extending through the swinging axis of the base plate.

Because the cylinder has to be mounted in an offset position, relative to the swinging axis of the base plate, the pusher plate and fingers, attached to the free end of the piston and guide rods, correspondingly have to be offset in a contra direction in order to establish their relationship to the swinging axis. The resultant torsional load applied to the piston and guide rods brings about a tendency for the outermost end of the pusher plate to droop, instead of maintaining a plane parallel to the dead plate, and in its worst condition the pusher plate may foul the dead plate, creating a jerky and unsatisfactory movement of the transfer mechanism.

OBJECTS OF THE INVENTION

The principal object of the present invention is to eliminate the foregoing disadvantages of the prior art transfer apparatus arising from cylinder offset and to provide an arrangement which is smoother in action, in which it is unnecessary to provide the two guide rods and bushes (which are provided to ensure that the pusher plate which is attached to the piston of the pneumatic motor travels, throughout the pneumatic cylinder stroke, over a path which is parallel and at right angles to the dead plate) which are difficult to maintain in parallelism and alignment and therefore create unnecessary friction, and in which the pneumatic motor can be mounted so that its center line extends through the swinging axis of the base plate with the result that 90° rotation is possible and aids in positioning the motor in two different locations respectively for left and right hand operation.

SUMMARY OF THE INVENTION

With this object in view, the present invention provides a glassware forming machine having a non-handed transfer mechanism, for transferring hot newly-formed glassware from a dead plate of the machine to a moving conveyor thereof, which conveyor is moving in one of its two directions, said transfer mechanism comprising a fluid motor including a body within which are machined two parallel cylinder bores between which is a mounting arrangement, provided on its center line between the two cylinder bores, a pair of reciprocative pistons having ringed piston heads slidable within said cylinders and having respective pistons extending from said body through respective guide bushings and connected at their free ends to a pusher plate having fingers extending therefrom, a base plate swingable or pivotable about a substantially vertical axis through at least 90°, and fixing means serving to mount the body of the fluid motor, by way of its mounting arrangement, on the base plate with its center line intersecting the swinging axis of the base plate.

The fluid motor preferably includes, connected to the pusher plate, a piston stop bar which serves to arrest the pusher plate and pistons at the end of the extending stroke.

Said motor advantageously also includes piston return-stroke cushions, of resilient material, which may be polyurethane, mounted to a rear end wall of the fluid motor body to cushion the pistons on the completion of their return strokes, in order to reduce shock vibrations.

The body may include double acting porting, machined within the said body, registering with corresponding parts in the base plate. The base plate conveniently serves as mounting means for mounting the body on an oscillatory vertical drive shaft, in a selected one of two positions, according to whether said transfer mechanism is to be used for right hand or left hand transfer, said base plate having built-in fluid ducts adapted to communicate with fluid supply lines which are in a fixed position relative to the base plate, the fluid ducts being suitable for right hand or left hand transfer, without adaption.

The arrangement of the invention preferably includes, between the pusher plate and the free ends of the piston rods, a piston tie plate mounted on the free ends of the pistons and constraining them to move in parallel and in unison, said piston tie plate comprising a plate of rectangular section having in its front face a pair of holes to which it is attached to the pistons, and a series of holes and slots for the attachment thereto of the pusher plate and fingers. The piston tie plate preferably has accurately machined edges on which are a further series of holes for the same purpose, and, in its rear face, a transverse slot, which serves as a piston anti-rotation device, of a width designed to coincide with, and house, corresponding piston anti-rotation flats machined on the free ends of the piston rods.

The tie plate may also have a clevis fork arrangement for the pivotal attachment of a stop bar, by insertion of a clevis pin.

The stop bar is preferably adapted to be brought into a stable position away from the permitting access to the mounting arrangement.

Said stop bar may comprise a parallel bar having an adjustable sliding pinch stop arrangement, provided with resilient cushions, which may be polyurethane, in its body abutment face, to prevent piston impact on the completion of the extension stroke, and means for preventing impingement of the bar, enabling fine adjustment to be accomplished, being pivotally attached to the piston tie plate by way of a slot and clevis arrangement, the bar being capable of being pivoted from a normally horizontal operating position, to an inoperative or servicing position extending approximately vertically and marginally over-centre, in order to maintain its upright attitude by abutting against the piston tie plate.

The cylinder body is preferably provided with a hinged cover plate which bridges the mounting arrangements. This conveniently comprises suitably weighted and proportioned hinge adapted to allow it to maintain the cover plate in an open position in order to permit access to the mounting arrangement and adjustment or attention to the stop bar arrangement, and to allow it to maintain the cover plate in a horizontal closed position to prevent the ingress of extraneous matter during use, and to prevent damage to the stop bar arrangement which might otherwise be used by personnel as a platform on which to stand, whilst servicing overhead equipment on the machine.

A particular advantage of the invention lies in its universal application by virtue of the non-handed central mounting of the cylinder body involving the minimum of rearward centreline projection and avoiding interference with other parts of the machine. This enables a single pneumatic motor to be used to cover zero to 5" (12.5 cm) stroke extension, it being necessary only to adjust the sliding pinch stop arrangement to limit the stroke to the desired extension.

BRIEF DESCRIPTION OF THE DRAWINGS

The invention will be described further, by way of example, with reference to the accompanying drawings, in which.

DESCRIPTION OF THE ILLUSTRATED PREFERRED EMBODIMENT

Figure 1:
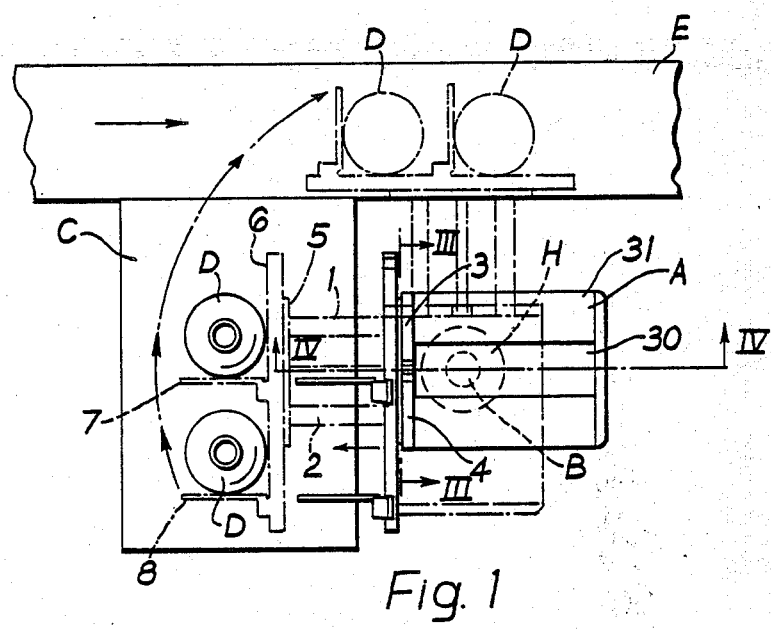
FIG. 1 is a diagrammatic plan view illustrating a practical embodiment of the glassware forming machine of the invention having its transfer apparatus adapted for right hand transfer.

As shown in the drawings, the illustrated preferred embodiment of the glassware forming machine according to the invention comprises transfer apparatus including a fluid motor A swingable about a vertical axis provided by an upright shaft B and operative to engage with newly-formed hot glassware represented by bottles D, standing on a deadplate C, and to transfer them from the deadplate C onto an adjacent conveyor E. In the case of FIG. 1, the transfer is effected in one direction of swinging of the motor A, and in FIG. 2 it is effected in the opposite swinging direction.

The fluid motor A (which is preferably pneumatic) has two extensible and retractable pistons having respective piston rods 1 and 2 guided, where they project from the motor A, by respective bushed front plates 3 and 4. Carried at the free projecting ends of the pistons 1 and 2 is a tie plate 5 which serves also as a stop pivot plate and further attachment plate and which constrains the pistons 1 and 2 to move in parallel and in unison throughout their strokes. Fixed to the tie plate 5 is a pusher plate 6 having finger plates 7 and 8, projecting forwardly therefrom.

When the pistons 1 and 2 are extended to project over the dead plate C, as shown in dot-dash lines in FIG. 1, the pusher plate 6 and the finger plates 7 and 8 move into engagement with or into a position spaced by a slight clearance away from the newly-formed hot bottles D. When the fluid motor A of FIG. 1 is moved clockwise through a 90° swinging movement about the vertical axis provided by the shaft B, as indicated generally by the arrows, the bottles D are moved along an arcuate path and are thereby transferred onto the conveyor E which is moving from left to right as viewed in FIG. 1.

Having deposited the bottles D on to the conveyor E, in the position shown in dot-dash lines in the upper part of FIG. 1, and after a short interval to allow the bottles D to move clear of the finger plates 7 and 8m the fluid motor A operates to retract the pistons 1 and 2. The fluid motor A is then swung back in a counter-clockwise direction through 90°, by rotational movement of the shaft B, to its starting position which is shown in full lines in FIG. 1. The described cycle is then repeated in timed relationship with the remainder of the glassware forming machine all of which is well understood by those skilled in the art and which serves to deposit fresh newly formed bottles D onto the dead plate C.

Figure 2:
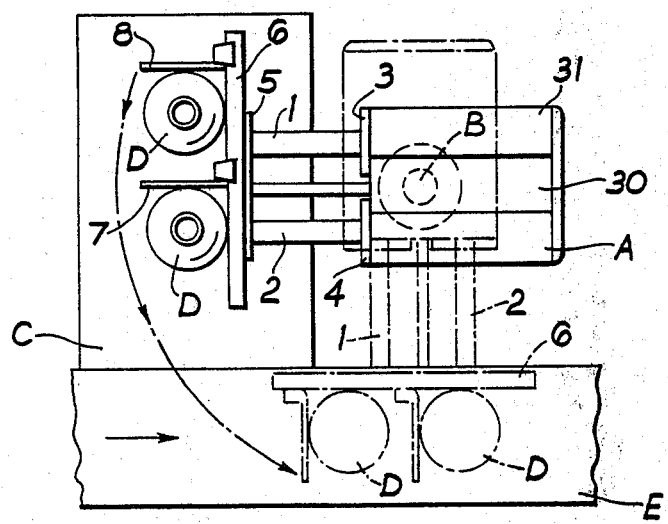
FIG. 2 is a view similar to FIG. 1, but showing the machine with its transfer apparatus mounted for left hand transfer and with its pistons extended.

The arrangement of FIG. 2 is generally similar to that of FIG. 1 but, in this case the fluid motor A is mounted on the shaft B for left hand swinging movement from the illustrated position through 90° in the counter clockwise direction to transfer the bottles D from the respective dead plate C to the corresponding moving conveyor E. As shown, the conveyor E in FIG. 2 is located at the side of the machine opposite to that of the conveyor E in the FIG. 1 arrangement.

As can be observed, in providing for the right hand and left hand working positions, respectively shown in FIGS. 1 and 2, the mounting of the fluid motor A is completely unchanged, because of the fact that its fixing to the shaft B is such that the center line of the fluid motor A extends through the swinging axis provided by the shaft B. All that have to be repositioned are the pusher plate 6 and its associated finger plates 7 and 8, which have to be reversed for left hand transfer which proceeds exactly as described above with reference to FIG. 1, but in the counter-clockwise direction.

Figure 3:
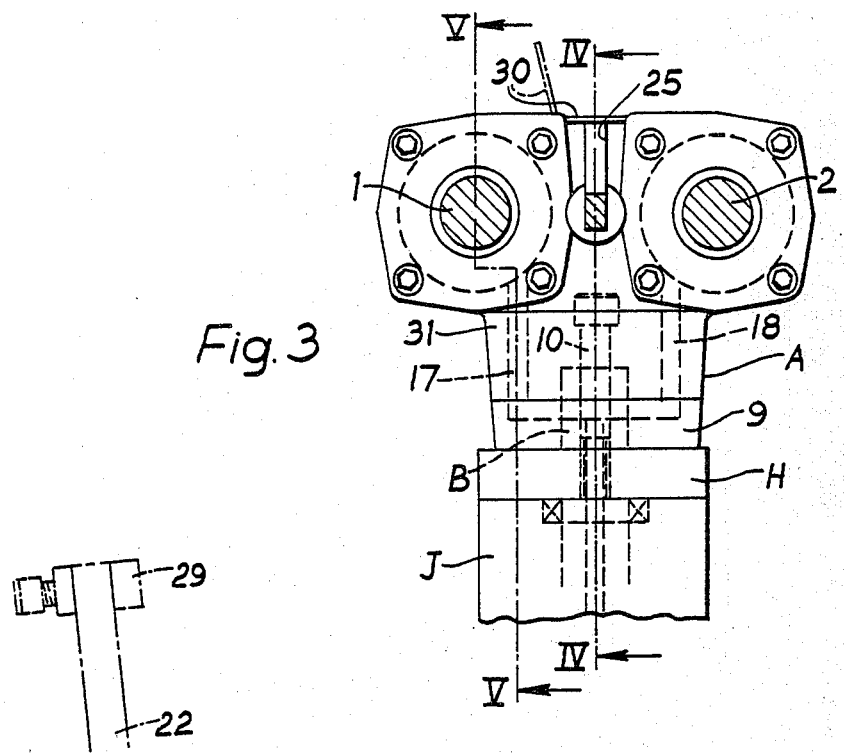
FIG. 3 is a part-sectional elevation, to a larger scale, taken along the line III—III of FIG. 1.

Referring now to FIG. 3, which is part-sectional view of the fluid motor A taken along the line III—III of FIG. 1, it will be seen that the motor A is mounted on a soleplate 9 having its center line above and coincident with the center line of the shaft B and secured by self-locking bolts 10 and 11 (see also FIG. 4), commonly for right or left hand action. As already mentioned, for the right hand mode, the pusher plate 6 and finger plates 7 and 8 are mounted to the piston tieplate 5 as shown in FIG. 1 whilst for the left hand mode they are mounted as shown in FIG. 2.

Also shown in solid lines in FIG. 3, in its horizontal closed position, is a mid-cylinder hinged cover plate 30, which is hingedly connected along one edge to motor body 31 so as to be supported by its other edge in a rebate machined in the body 31, thereby to bridge the gap between the two cylinders of the body 31. The purpose of the mid cylinder hinged cover plate 30 is to deny access of extraneous matter which could interfere with the functioning of a stop bar arrangement F which will shortly be described in more detail with reference to FIG. 4, and also to preclude the possibility of damage to the stop bar arrangement by personnel who tend to use the fluid motor A as a platform on which to stand whilst servicing overhead equipment on the machine. The mid cylinder coverplate 30 is also shown in FIG. 3, in dot-dash lines, in its upright open position providing access to the stop bar arrangement F for maintenance and adjustment, and also, when the stop bar arrangement has been swung out of the way, providing access to the fluid motor fixing bolts 10 and 11. These bolts are of the self locking type, to avoid fretting and leakage at the interfaces between the body 31 and the soleplate 9, and between the soleplate 9 and the machine table 4 which might otherwise be brought about by inertial forces arising during swinging movement of the transfer mechanism which will generally occur at a rate from eight to fifteen cycles per minute, but may be faster.

Figure 4:
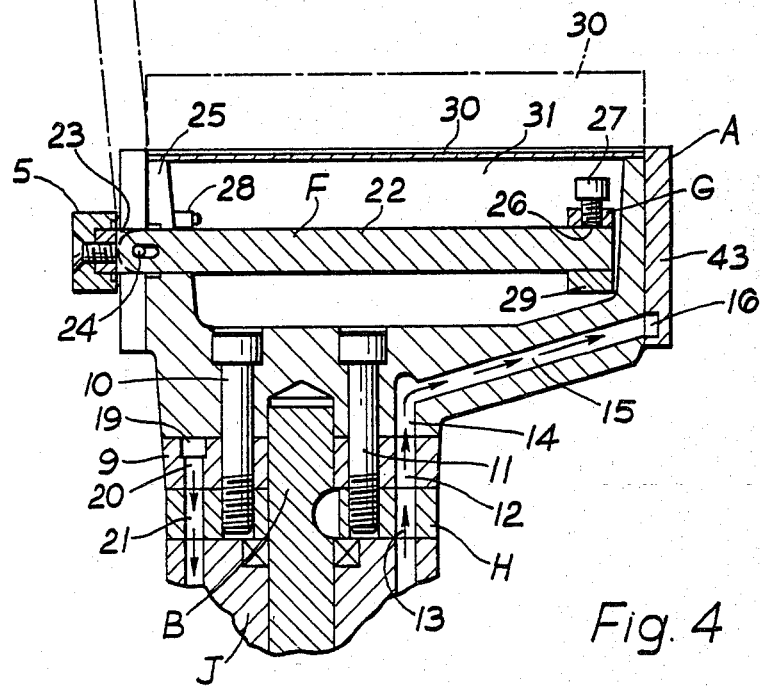
FIG. 4 is a part sectional view, also to an enlarged scale, taken as indicated by the lines IV—IV of FIGS. 1 and 3.

FIG. 4 is a sectional side elevation of the fluid motor, taken along the line IV—IV of FIGS. 1 and 3. As shown, the stop bar arrangement F is disposed above the horizontal center line between the cylinder bores, and in the recess between the two cylinders. This stop bar arrangement F comprises a parallel rectangular-section bar 22 located by being pivotally attached to the front plate 5 by a clevis fork 23 across which is secured a clevis pin 24 which extends through a guide slot 25 (see also FIG. 3) machined in the body 31 between the two cylinders and through a front flange of the body 31, such slot 35 being machined to support the bar 22 in a horizontal position. At the other end of the bar 22, remote from the pivot 24 is a sliding pinch stop arrangement G, comprising a stop 29, the function of which is to limit the stroke of the front plate 5 and thereby of the pistons 1 and 2. The stop 29 can be adjusted as desired along the bar 22, and its locking to the bar 22 is effected by means of a clamp screw 27 whose inner end engages with the upper face of the bar 22.

Above the horizontal center line of the motor A and at the rear of the front body flange are two shock absorbent cushions 28 and 28A which may be polyurethane and which are designed and positioned to prevent impact of the sliding pinch stop G, against the inner face of the front body flange, on the completion of the forward stroke of the pistons 1 and 2.

Figure 4A:
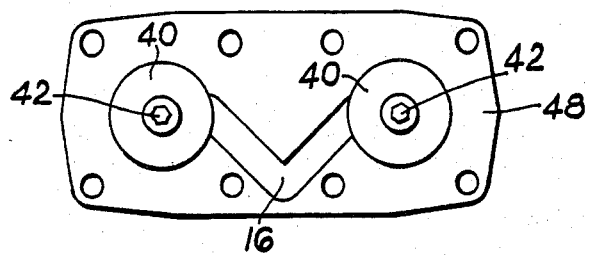
FIG. 4A is an elevation showing the inner face of the rear end wall of the pneumatic motor of the machine of FIGS. 1 to 4.

To accomplish the extension stroke of the pistons 1, 2 pressure fluid (preferably air) enters via port 12 in the soleplate 9 which is conveniently attached to a 3½" (8.75 cm) diameter type machine table H as most widely used in such glass making machines, so as to be co-incident with a port 13 of similar proportions, in the machine table H. The port 12 registers with a port 14 in the body 31, and port 14 connects with an angularly and longitudinally extending passage 15 which joins with a chevron-shaped transfer port 16 (see FIG. 4a) which serves both of the cylinders 1 and 2, in the rear wall of the body 31. Exhaust air exits via ports 17, of which one is shown in FIG. 5, which connects with a horizontal and transverse transfer port 19 serving both cylinders, and subsequently with a port 20 to exhaust through a port 21, in the machine table, of the same proportions as the port 13 and on the same pitch circle with respect to the shaft B, but 180° radially displaced from the port 13.

To accomplish the return stroke, the fluid flows in the reverse direction of that just described. Thus, the ports 13 and 21 reverse their functions (i.e. they serve alternatively as inlet and exhaust), as a result of relative rotation of the machine table H, relative to collar J upon which the table H rests, which is normally through an angle of 90°.

The soleplate 9 serves as a combination spacer block, machine table attachment block and port block bolted to the underside of the motor body 31 by way of a gasket interface, is designed in appropriate external proportions and porting details to achieve the specific piston center line height relationship, with respect to the dead plate C to which the machine, on which the transfer mechanism is attached, is related, and encompass the fluid porting provisions provided thereon.

Figure 5:
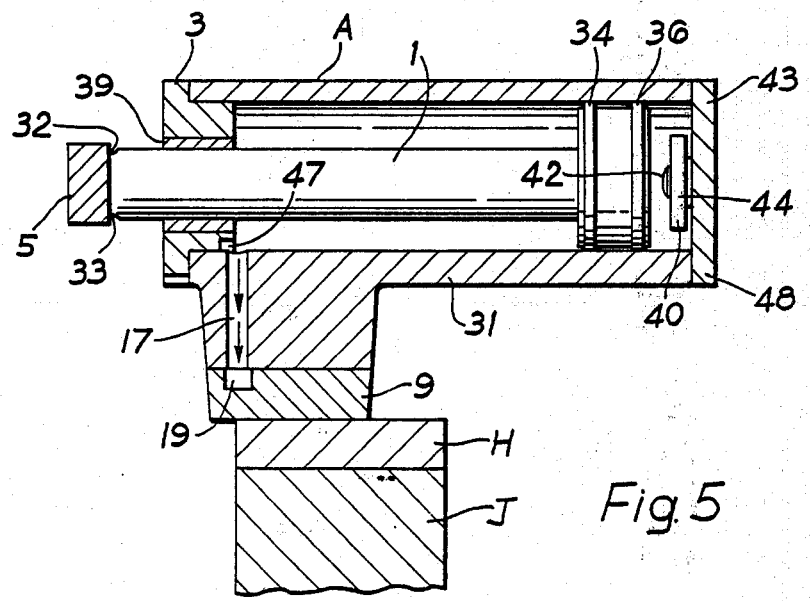
FIG. 5 is a section taken on the line V—V of FIG. 3.

FIG. 5 is a sectional view taken along the line V—V of FIG. 3 which is taken through one of a pair of forward end ports 17 and 18 and through the center line of the left hand cylinder containing the piston 1. As can be seen, the cylinder portion of the fluid motor A comprises the cylinder body 31, which is preferably cast iron, forward end plates 3 and 4 respectively, and rear end plate 48, the end plate being preferably of cast iron. These end plates 3, 4 and 48 are bolted to their respective ends of the cylinder body 31. The pistons 1 and 2 have fitted thereon piston rings 34 and 36 which, in addition to performing their recognised sealing functions, support the head of the piston with a minimal clearance between the inside diameters of the piston rings and the respective groove diameters in the pistons 1 and 2, a clearance being provided between the piston head and the cylinder bore, thereby reducing the possibility of the piston head slapping or kicking, at the stroke reversal and during its stroke, and thereby damaging the cylinder bore, even after appreciable ring wear has taken place, and in company with hardened steel bushings 38 and 39 set in the front plates 3 and 4, affording bearing support to the pistons 1 and 2 and resisting the deflection imposed by the cantilever load on the free ends of the pistons 1 and 2 by the pusher plate 6 and pusher fingers 7 and 8.

Attached to the inner wall of the rear end plate to face the heads of the pistons 1 and 2 are respective piston return stroke cushions 40 and 41 which are of a resilient material, such as flexible polyurethane, so located by respective attachment screws 42 and spacers 44 to damp reactionary vibration which would otherwise be generated by contact between the pistons 1 and 2 and the rear end plate 48 at the ends of their return strokes.

At the force ends of the pistons 1 and 2 there are anti-rotation flats 32 which engage into respective anti-rotational recesses 33 in the frontplate 5, this facility being provided for ease of on-site maintenance of the frontplate assembly, ensuring alignment of the stop bar 22 in its guidance slot 25.

In considering the advantages of the construction illustrated and described herein it must be remembered that the fluid motor A is mounted in combination with the glassware forming machine and in such a machine there is no room for the pistons to move rearward beyond the right hand end of the cylinder as viewed in FIG. 1. This limitation prevents counter balancing, and requires the extending and retracting member, whether it be piston or cylinder (since the motor A can, of course, be arranged with the pistons fixed and the cylinder body movable) to be supported in cantilever or equivalent fashion.

In order to accommodate differing diameters of glassware, it is desirable that the length of the stroke of the pistons 1, 2 should be adjustable. Accordingly means permitting such adjustment is provided, as is illustrated in FIG. 4 and as has been described above.

Figure 4B:
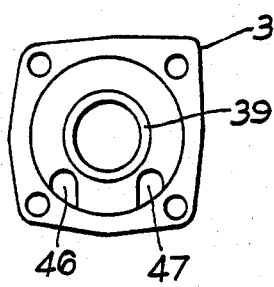
FIG. 4B is an elevation showing the inner face one of the front walls of the said pneumatic motor.

The various components of the glassware forming machine are operated in a co-ordinated and timed relationship as follows. Firstly, with the fluid motor A facing the dead plate C with the pistons 1 and 2 retracted, compressed air is supplied into the lower end of the port 13, and air is vented through the lower end of the port 21. The flow paths of the compressed air and venting air are indicated by the arrows in FIGS. 4 and 5. The compressed air passes from the machine table port 13, and through the ports 12, 14 and 15 whereafter it passes to the two cylinders via the chevron-shaped transfer port 16 (FIG. 4A) Accordingly, the compressed air is applied to the rear surfaces of the piston heads, causing the pistons to extend rapidly. During this extension of the pistons, air is exhausted from the annular chamber, by way of vent ports 46 and 47 (FIG. 4B) in the front end walls 3 and 4, vertical ports 17, horizontal port 19, down port 20, and escapes through port 21 and associated aligned passages in the machine table H. In this way, the piston rods 1 and 2 carrying the pusher plate 6 and the finger plates 7 and 8 are moved fully outwardly to the fully extended position shown in dot-dash lines in FIG. 1.

When the pistons are fully extended toward the dead-plate C as shown in dot-dash lines in FIG. 1 and in full lines in FIG. 2, the fluid motor A (as well as the machine table H) is rotated clockwise 90°, as viewed in FIG. 1, by 90° rotation of the shaft B, in well understood manner, the collar J remaining stationary. The bottles D or other glassware items are accordingly carried by the finger plates 7 and 8 along an arcuate path indicated generally by the arrows in FIG. 1 and deposited on the moving conveyor E. The rate of movement of the bottles D along the arcuate path corresponds to the rate of movement of the conveyor E.

After the bottles D have reached the positions on the conveyor E shown in dot-dash lines on FIG. 1, and after allowing an instant for the bottles to be carried away from the finger plates 7 and 8, the pistons 1 and 2 are retracted to withdraw the pusher plate 6 and finger plates 7 and 8. Retraction of the pistons 1, 2 and of the pusher plate 6 and finger plates 7, 8 is effected by supplying compressed air to the port 20 and venting the cylinders through the port 13, the movement of air being in the opposite direction from that indivated in FIG. 4. This reversal in direction of air flow is accomplished, as is well understood, as a result of the 90° rotation of the shaft B, and the fluid motor A and machine table H, relative to the collar J through which the air is supplied by changing over the alignment of air passages so that the port 13 becomes aligned with a compressed air supply port in the collar J while the port 21 becomes aligned with an air venting port in the collar J. The compressed air then passes through the ports 21 and 20 along the horizontal and transverse transfer port 19, rises through the port 17 and 18, and is then applied against the forward annular surfaces of the heads of the pistons 1 and 2. The pistons are thereby retracted, moving to the right as viewed in FIG. 5. During this retraction movement, air to the rear of the piston heads is vented by the chevron transfer port 16 in the rear end plate 48, the horizontal and angular port 15, the port 14 and the port 12, and exhausts through the port 13.

I claim:

1. In a glassware forming machine having a non-handed transfer mechanism for transferring newly-formed hot glassware from a dead plate to a conveyor movable in two directions, the transfer mechanism comprising:

a fluid motor including a pair of parallel cylinder bores, a shaft fixed to the fluid motor central to the center line between the cylinder bores, a pair of reciprocative pistons having ringed piston heads slidable within respective cylinder bores and extending therefrom through respective guide bushings, a base plate mounting the shaft and being pivotable about a substantially vertical axis through at least 90°, with the center line between the cylinder bores intersecting the swinging axis of the base plate, a piston tie plate connected to the free ends of the piston rods, for constraining the piston rods to unison movement in parallelism, a pusher plate mounted on the piston tie plate, finger plates mounted on and extending forwardly of the pusher plate, a piston stop bar connected to the pusher plate for arresting the pusher plate and pistons at the end of the extending stroke, resilient piston return-stroke cushions on the fluid motor for cushioning the pistons against vibrations at the completion of their return strokes, a clevis fork on the tie plate, a clevis pin insertable in the clevis fork for the pivotal attachment of a stop bar, and fine adjustment means for preventing impingement of the stop bar, and being pivotally attached to the piston tie plate by way of a slot and clevis arrangement, the stop bar being capable of being pivoted from a normally horizontal operating position to an inoperative or servicing position extending approximately vertically and marginally over-center in order to maintain its upright attitude by abutting against the piston tie plate.

2. In a transfer mechanism for a glassware forming machine for transferring newly-formed hot glassware from a dead plate to a conveyor, the transfer mechanism comprising:

a fluid motor accommodating a pair of parallel cylinder bores, a shaft fixed to the fluid motor central to a center line between the cylinder bores, a pair of reciprocative pistons having ringed piston heads slidable within respective cylinder bores and extending therefrom through respective guide bushings, a base plate mounting the shaft and motor and being pivotable about a substantially vertical axis with the center line between the cylinder bores intersecting the swinging axis of the base plate, a piston tie plate connected to the free ends of the pistons for constraining the pistons to unison and parallel movement, a pusher plate mounted on the piston tie plate, finger plates mounted on and extending forwardly of the pusher plate, a piston stop bar located centrally of the pistons and connected to the piston tie plate for arresting the pusher plate and pistons at the end of the extending stroke, resilient piston return-stroke cushions on the fluid motor for cushioning the pistons against vibrations at the completion of their return strokes, a clevis fork on the tie plate, a clevis pin insertable in the clevis fork for the pivotal attachment of the stop bar, and fine adjustment means for preventing impingement of the stop bar being pivotally attached to the piston tie plate by way of a slot and clevis arrangement, the stop bar being capable of being pivoted from a normally horizontal operating position to an inoperative position extending approximately vertically and marginally over-center in order to maintain its upright attitude by abutting against the piston tie plate.

3. In a transfer mechanism for a glassware forming machine for transferring hot newly-formed glassware from a dead plate to a moving conveyor, the combination of:

a fluid motor assembly characterized by a housing accommodating a pair of stationary cylinders and a respective pair of reciprocating tubular pistons, a motor support post supported in the housing and disposed on the longitudinal center line between the cylinders of the pair, a mounting plate being pivotal about a vertical axis through 90° for changing the positions of the pistons to accommodate the motor for either a right hand or left hand disposition with its center line intersecting the swinging axis of the mounting plate, a fingered pusher plate connected to the outboard free ends of the pistons, fixing means for mounting the mounting plate a piston stop bar located centrally of the pusher plate and connected to the pistons for arresting the pistons at the end of the extending stroke; and parts in the mounting plate and connected fluid supply lines for supplying fluid to the motor.

4. A glassware forming machine as claimed in claim 3 wherein the motor also includes piston return-stroke cushions of resilient material mounted to the motor to cushion the pistons at the completion of their return strokes in order to reduce shock vibrations.

5. A glassware forming machine as claimed in claim 3 wherein the mounting plate serves as mounting means for mounting the motor on an oscillatory shaft in a selected one of two positions according to whether the transfer mechanism is to be used for right hand or left hand transfer, said mounting plate having built-in fluid ducts adapted to communicate with fluid supply lines which are in a fixed position relative to the mounting plate, the fluid ducts being suitable for right hand or left hand transfer.

* * * * *